US008036712B1

(12) United States Patent
Weidner et al.

(10) Patent No.: US 8,036,712 B1
(45) Date of Patent: Oct. 11, 2011

(54) RADIO APPARATUS WITH A CONTROL ELEMENT FOR SELECTING AND/OR ACTIVATING FUNCTIONS DISPLAYED ON A DISPLAY DEVICE

(75) Inventors: Wolfgang Weidner, Windach (DE); Hans Murcas, Koenigstein (DE); Bernt Klein, Norresundby (DK)

(73) Assignees: IPCOM GmbH & Co. KG, Pullach (DE); Robert Bosch GmbH

( * ) Notice: Subject to any disclaimer, the term of this patent is extended or adjusted under 35 U.S.C. 154(b) by 1043 days.

(21) Appl. No.: 09/367,569

(22) PCT Filed: Feb. 18, 1998

(86) PCT No.: PCT/DE98/00482
§ 371 (c)(1),
(2), (4) Date: Dec. 21, 1999

(87) PCT Pub. No.: WO98/37681
PCT Pub. Date: Aug. 27, 1998

(30) Foreign Application Priority Data

Feb. 20, 1997 (DE) .................................. 197 06 595

(51) Int. Cl.
*H04M 1/00* (2006.01)
*H04M 3/00* (2006.01)
(52) U.S. Cl. ...................... 455/566; 455/550.1; 455/418; 345/172
(58) Field of Classification Search .................. 455/566, 455/158.4, 550, 556, 557, 90; 345/840, 835, 345/810, 271, 172, 69
See application file for complete search history.

(56) References Cited

U.S. PATENT DOCUMENTS

| 5,258,748 | A | * | 11/1993 | Jones | 345/172 |
| 5,373,551 | A | * | 12/1994 | Baals | 379/110 |
| 5,396,547 | A | * | 3/1995 | Baals | 379/96 |
| 5,412,713 | A | * | 5/1995 | Baals | 379/96 |
| 5,487,104 | A | * | 1/1996 | Baals | 379/96 |
| 5,615,257 | A | * | 3/1997 | Pezzullo | 379/396 |
| 5,633,912 | A | * | 5/1997 | Tsoi | 379/58 |
| 5,767,825 | A | * | 6/1998 | Dagdeviren | 346/56 |

(Continued)

FOREIGN PATENT DOCUMENTS

CH    686 541    4/1996

(Continued)

OTHER PUBLICATIONS

Nokia 2110, Nokia Mobile Phone User's Guide.

(Continued)

*Primary Examiner* — George Eng
*Assistant Examiner* — Marcos Torres
(74) *Attorney, Agent, or Firm* — Nelson Mullins Riley & Scarborough LLP

(57) ABSTRACT

A radio apparatus embodied in a radio telephone has a display device and at least one control element for selecting and/or activating functions of the radio apparatus that are displayed on the display device. The control element is disposed neighboring the display device so that a local association exists between the control element and the displaying of functions of the radio apparatus on the display device. The apparatus further includes means for providing at least one first operating mode in which information about the first operating mode is associated in the display device with the control element. Information in a second operating mode associated with the first operating mode is converted into a function for activating the first operating mode, which function is activateable by the control element.

2 Claims, 6 Drawing Sheets

U.S. PATENT DOCUMENTS

| | | | | |
|---|---|---|---|---|
| 5,797,091 A | * | 8/1998 | Clise | 455/404 |
| 5,852,783 A | * | 12/1998 | Tabe | 455/550 |
| 5,867,774 A | * | 2/1999 | Summers | 455/90 |
| 5,875,403 A | * | 2/1999 | Christal | 455/550 |
| 5,907,325 A | * | 5/1999 | Okafuji | 345/333 |
| 5,956,628 A | * | 9/1999 | Owaki | 455/158.4 |
| 5,969,718 A | * | 10/1999 | Mills | 345/348 |
| 6,046,730 A | * | 4/2000 | Bowen | 345/168 |

FOREIGN PATENT DOCUMENTS

| | | |
|---|---|---|
| DE | 41 36 065 A1 | 5/1993 |
| DE | 195 34 789 A1 | 3/1996 |
| DE | 195 29 182 A1 | 2/1997 |
| DE | 196 05 373 A1 | 8/1997 |
| EP | 0 470 403 | 2/1992 |
| EP | 0 633 684 | 1/1995 |
| EP | 0 731 590 | 9/1996 |
| WO | 97/29582 | 8/1997 |

OTHER PUBLICATIONS

JP 08251366 of Sep. 27, 1996 (English Abstract only).

L. Andreasen et al: "ADSI: The Dawn of a New Age of_" Telesis, No. 97, Dec. 1993, pp. 35-50 (In English).

* cited by examiner

RADIO APPARATUS WITH A CONTROL ELEMENT FOR SELECTING AND/OR ACTIVATING FUNCTIONS DISPLAYED ON A DISPLAY DEVICE

BACKGROUND OF THE INVENTION

The invention is based on a radio apparatus

From German Patent Application 1 96 05 373.0, which had not yet been published by the filing date of the present application, a cordless telephone with a display device is already known.

From German patent document DE 41 36 065 A1 a mobile, program control device for entertainment and/or telecommunication is known, such as for example a mobile part of a cordless telephone, a radio apparatus or the like. In this device individual control elements are located laterally right near a display field. The control elements are identified correspondingly with a symbol or a text, and this indication corresponds to the symbol in the display use. The control elements are locally associated with the symbols in the display field.

SUMMARY OF THE INVENTION

In keeping with these objects and with others one feature of present invention resides, briefly stated, in that at least one first operating mode is provided, in which information about this operating mode is associated in the display device with the at least one control element, and the information in a second operating mode associated with the first operating mode is converted into a function for activating the first operating mode, which function can be activated by the at least one control element.

The radio apparatus according to the invention has the advantage over the prior art that at least one control element for selecting and/or activating functions of the radio apparatus that can be displayed on the display device is provided, and that the at least one control element is disposed in the preferably immediate vicinity of the display device, so that a local association exists between the at least one control element and the display of the functions of the radio apparatus one on the display device. In this way, the operation and clarity for the user are made considerably simpler and better. This also makes operation faster and more reliable.

It is advantageous that between the at least one control element and the display of the associated functions of the radio apparatus on the display device, graphic symbols preferably shaped as arrows can be displayed on the display device. In this way, the local association of the at least on control element for displaying the associated functions is further improved, and the clarity for the user is increased.

In particular the fact that at least one control element can light up is advantageous. This makes easy, certain and rapid operation possible, above all even in the dark.

It is also advantageous that a control field, preferably with an alphanumeric keypad, is provided, and that the at least one control element is located away from the control field. In this way, keys in the control field are economized on, and the control field becomes clearer and simpler to use for the user, thus increasing the ease of use.

It is also advantageous that the at least one control element is disposed in the preferably immediate vicinity of the peripheral region of the upper service of the housing of the radio apparatus. In this way, the at least one control element is better accessible to the user, so that it is possible to operate the at least one control element with the fingers of the hand holding the radio apparatus. In other words, the radio apparatus can be operated appropriately with one hand.

BRIEF DESCRIPTION OF THE DRAWINGS

Exemplary embodiments of the invention are shown in the drawing and described in further detail in the ensuing description.

DESCRIPTION OF THE PREFERRED EMBODIMENT

Figure 1:
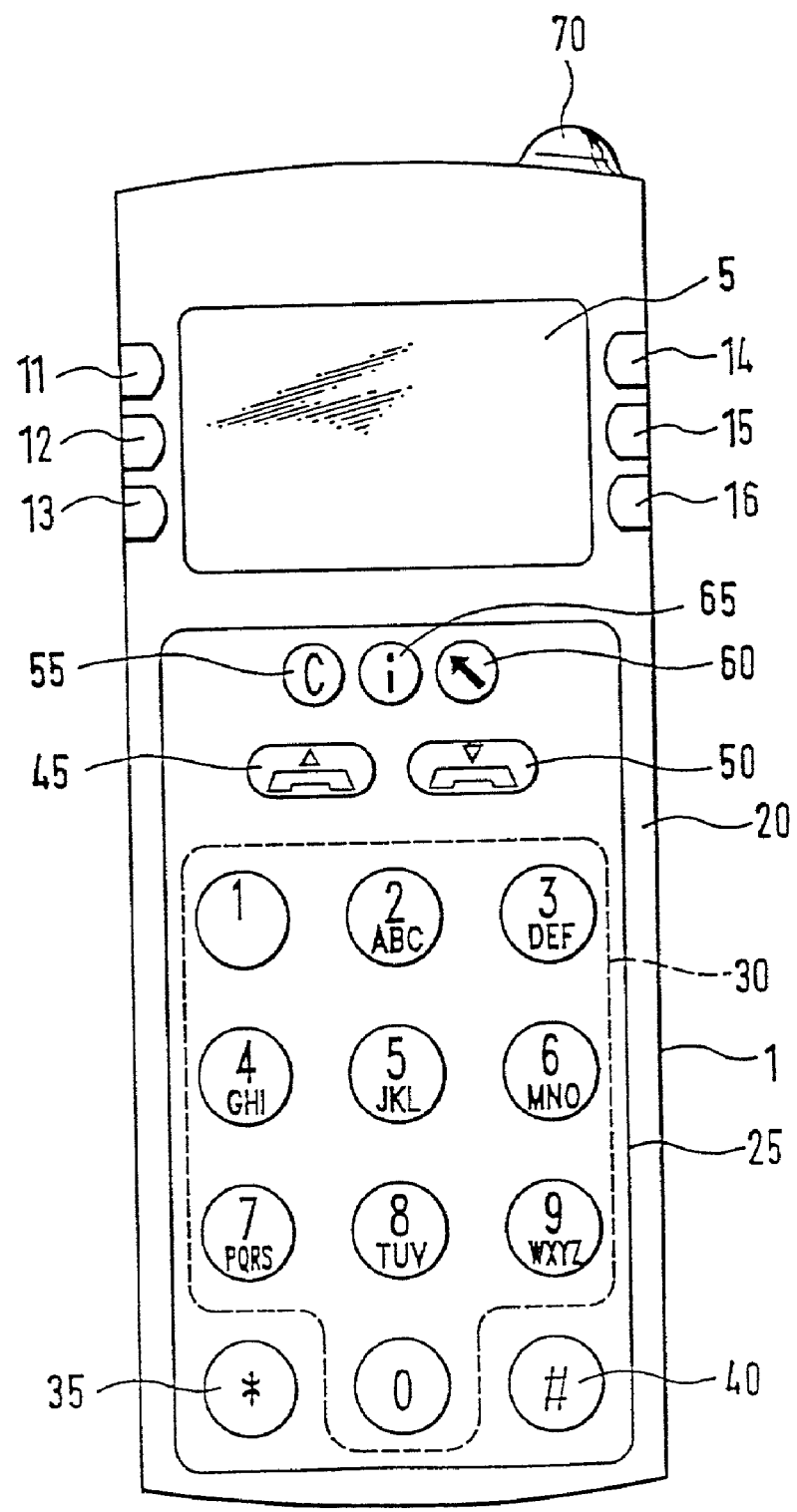
FIG. 1 shows a front view of a mobile phone, and FIGS. 2 through 9 each show one example for an association of menu subitems, shown on the display device, with corresponding control elements.
Figure 2:
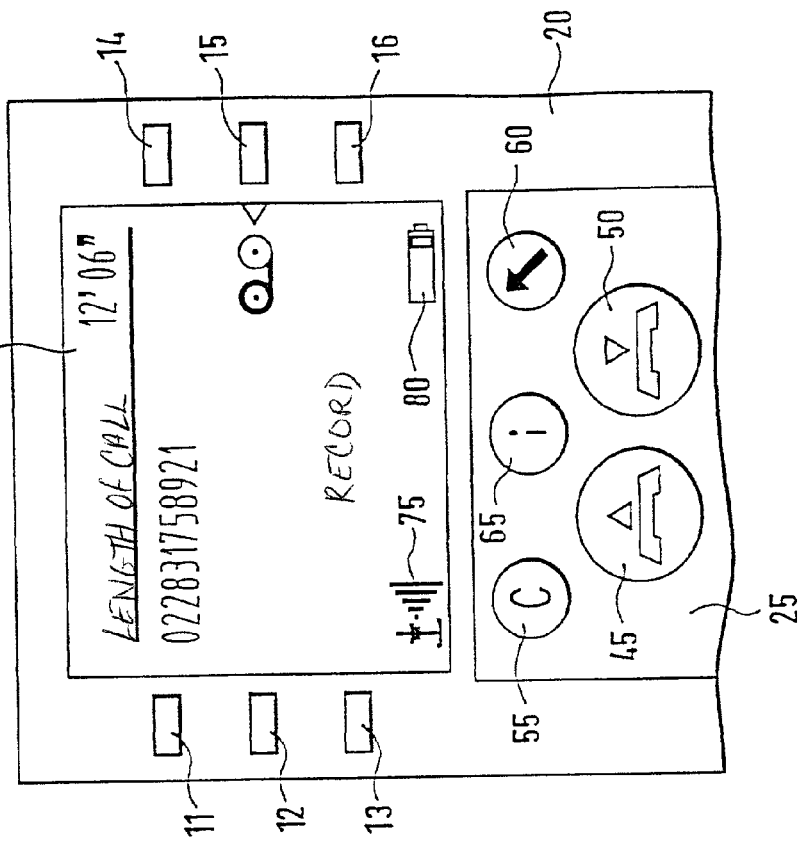
Figure 10:
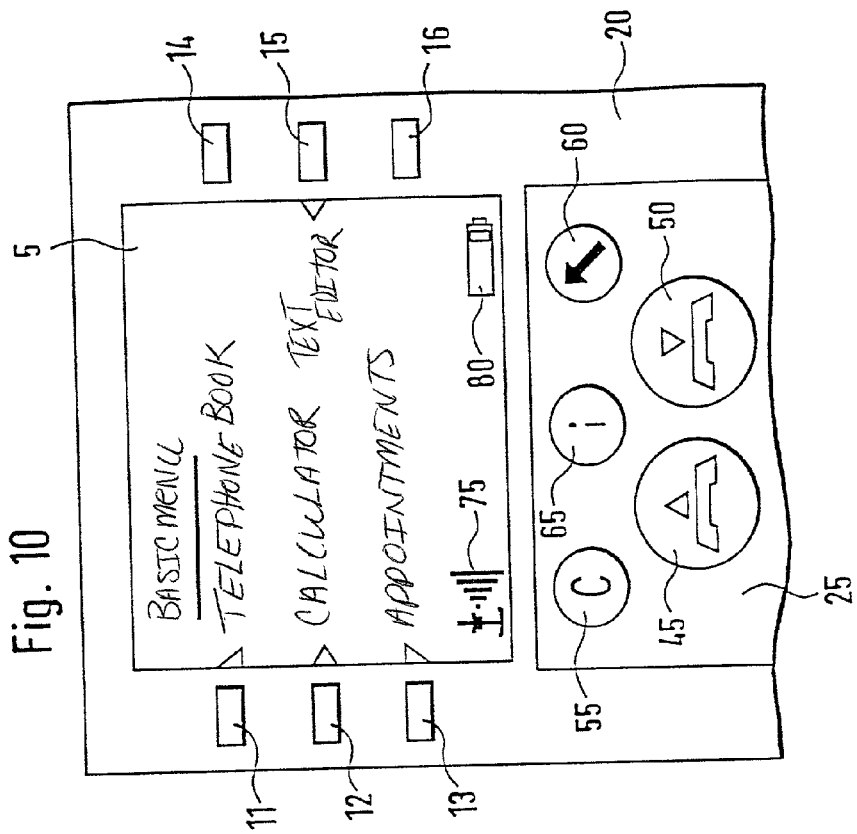
FIG. 10 shows the display on a display device of the radio apparatus of a basic menu for guiding the user.

In FIG. 1, reference numeral 1 identifies a radio apparatus embodied as a radio telephone, which can for instance be embodied as either a mobile phone or a cordless phone. On the upper surface 20 of its housing, the radio apparatus 1 has a control field 25 with an alphanumeric 10- key keypad 30, a star key (*) 35, and a pound key (#) 40. The control field 25 also includes a first fork contact key 45 for accepting an incoming call or for loop occupation and a second fork contact key 50 for ending a call state or releasing the loop. These two functions can also be embodied by a single key. The control field 25 also includes a basic state key 55 for activating the display of a basic operating menu on a display device 5 disposed above the control field 25 on the upper surface 20 of the housing. The control field 25 also includes an information key 65, by whose actuation an information text on a currently set menu point is shown on the display device 5. By actuating a backspace key 60, also disposed in the control field 25, the control operation most recently performed is rescinded; for instance, the last digit entered to dial a call is erased, or a switch is made, from showing an information text about the currently set menu point on the display device 5, back to showing the currently set menu point itself on the display device 5, or the like. The display device 5 is substantially rectangular, and one of the two long sides is oriented toward the control field 25, while the other long side is oriented toward an antenna 70 on the upper edge of the radio apparatus 1. Between the left short side and the left edge of the upper surface 20 of the housing, a first control element 11, a second control element 12, and a third control element 13 are disposed along this short side on this surface 20 of the housing. Between the right-handed short side of the display device 5 and the right edge of the surface 20 of the housing, a fourth control element 14, fifth control element 15 and sixth control element 16 are disposed along this short side. The six control elements 11, ..., 16 are dimensioned in size such that they are disposed both in the immediate vicinity of the display device 5 and in the immediate vicinity of the peripheral region of the surface 20 of the housing of the radio apparatus 1. In this way, the control elements 11, ..., 16 can be associated directly and locally with the functions of the radio apparatus 1 that can be displayed on the display device 5 and at the same time allow one-hand operation by the user with the fingers of the hand that is also holding the radio apparatus 1. By means of the control elements 11, ..., 16, the locally directly associated functions, which are displayed on the display device 5, can be selected and/or activated. Because of their disposition on the two short sides of the display device 5, the control elements 11, ..., 16 are located away from the control field 25. In FIG. 10, the basic menu for user guidance is shown on the display device 5. In the exemplary embodiment described here, the basic menu includes a telephone book function, a calculator function, an appointment function, and a text editor function, all as menu subitems. The first control element 11 is associated locally with displaying the telephone book function, the second control element 12 is associated locally with displaying the calculator function, the third control element 13 is disposed locally with displaying the appointment function, and the fifth control element 15 is associated locally with displaying the text editor function. The local association is reinforced by arrow-shaped graphic symbols, which can be displayed between the various control elements 11, 12, 13, 15 and the display of the associated functions of the radio apparatus 1 on the display device 5. No functions are assigned to the fourth control element 14 and the sixth control element 16 here. If there are more than six selectable menu subitems, then individual control elements can also be used to switch over to functions of the basic menu that were previously not visible. The display device 5 also includes a first symbol 75 for representing the reception quality by means of the number of lengthwise bars, located away from a stylized radio tower and indicating the broadcasting of a transmission signal, and a second symbol 80 for representing the charge state of the battery of the radio apparatus 1. By entering a telephone number using the alphanumeric 10-key keypad 30, the basic menu, or the current display on the display device 5, is replaced by the display of the telephone number entered, as shown in FIG. 2; the entered telephone number forms a main menu item, for which two menu subitems are also shown on the display device 5. That is, the function of entering the dialed telephone number into redial is assigned as a menu subitem to the second control element 12, and the function of storing the entered telephone number in a telephone number memory of the radio apparatus 1 is assigned as a menu subitem to the third control element 13. By actuation of the second control element 12, the corresponding function is activated, and a redial with the entered telephone number is performed. When the third control element 13 is actuated, once again the corresponding function is activated, and the entered telephone number is stored in the telephone number memory.

Figure 3:
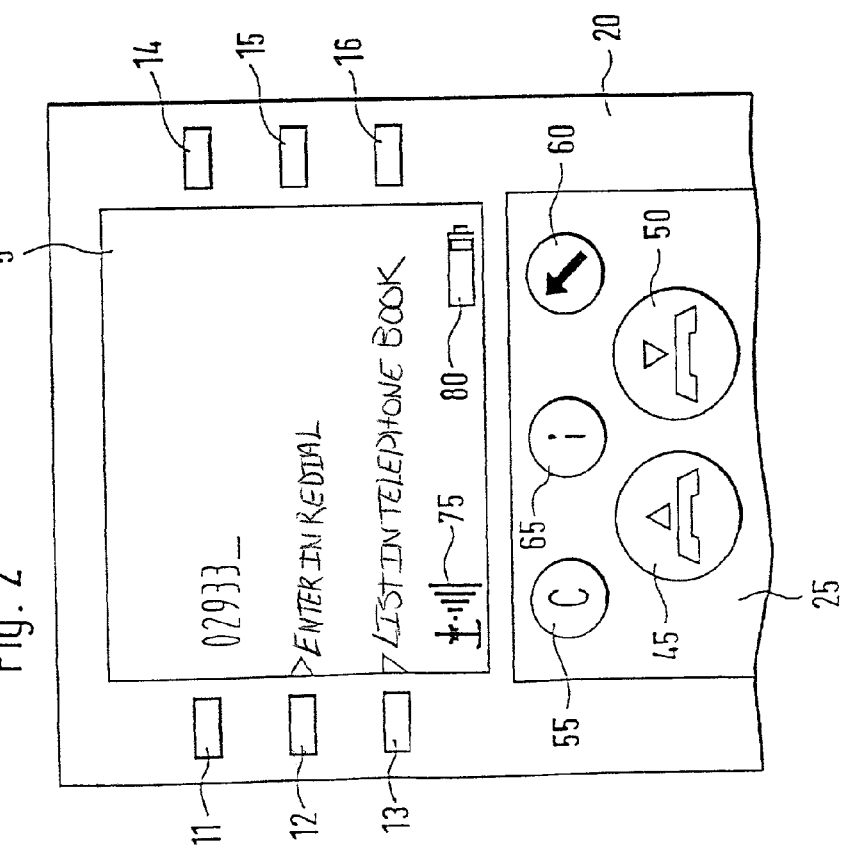
Figure 4:
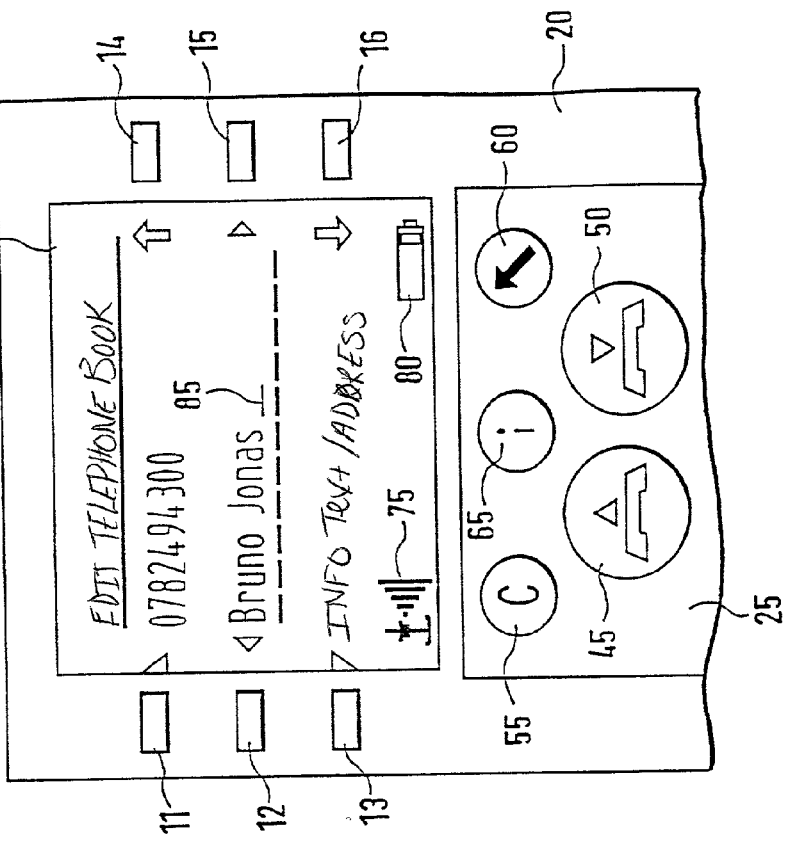

When the party called via the radio apparatus 1 accepts the call, or if an incoming call is accepted by actuation of the first fork contact key 25, whatever is currently displayed on the display device 5 disappears, and a screen defining the call status is shown on the display device 5, as shown in FIG. 3. The main menu item here is the word "call", and the length of the call is inserted. The number called and optionally the name of the person called from the radio apparatus 1 or calling in are also shown. The fifth control element 15 is assigned a recording function, so that by actuation of the fifth control element 15, a recording of the current call is made. Taking the exemplary embodiment of FIG. 3 as the point of departure, in FIG. 4 a name can be associated with the called number, shown on the display device 5, of the person called in the radio apparatus 1; this name is also shown on the display device 5. If during the call the radio apparatus 1 receives a call from a third person, this can once again be shown on the display device 5, thanks to digital switching technology. The third control element 13 is then assigned a function, as a menu subitem, by which upon actuation of the third control element 13, while maintaining the original connection, the call coming in in the meantime can also be accepted. In this way, two speech connections can be set up simultaneously. After the second call is accepted by actuating the third control element 13, an expansion of the screen, beginning with the screen shown in FIG. 4, is made in accordance with FIG. 5. The main menu item then is the call currently being conducted, whose length and calling number of the associated person being called are also inserted. In FIG. 5a), this is the second call that has been accepted during the original call. The second control element 12 is assigned the function of taking over the first call, which is done upon actuation of the second control element 12. The third control element 13 in this case has no function and instead is merely assigned the information that the second call is currently being conducted. For the sixth control element 16, the assigned function is a conference call, so that when the sixth control element 16 is actuated a conference call among all three persons is established. The recording function assigned to the fifth control element 15 is still operative, as in FIGS. 4 and 3.

Figure 5B:
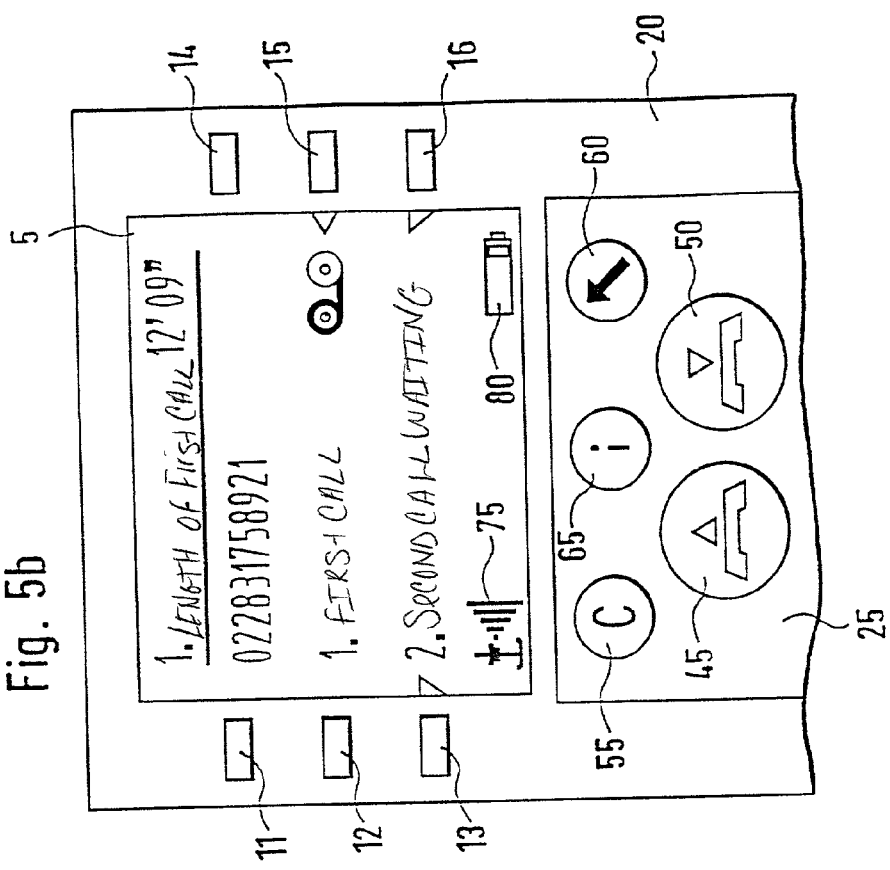
Figure 5A:
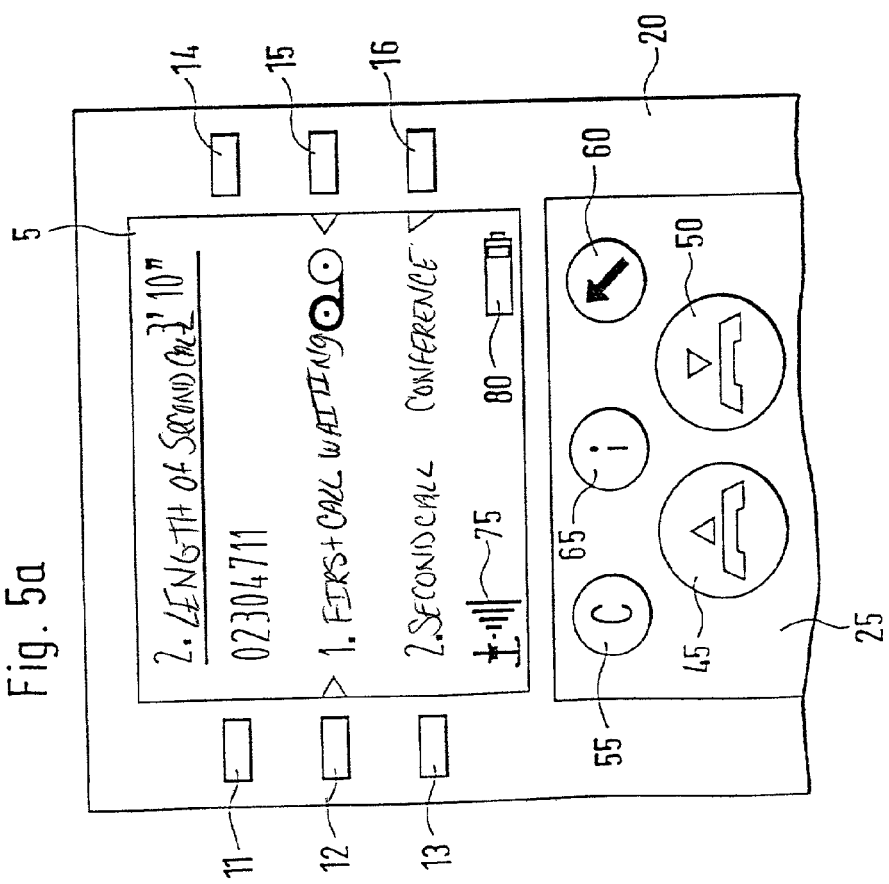

In FIG. 5b), the screen on the display device 5 is shown that results after the switchover from the second call to the original call by actuation of the second control element 12. As the main menu item then, the first call is made the current call, and its length and the telephone number of the associated party in the call are inserted. The function of the third control element 13 is now to take over the second call, which is done upon actuation of the third control element 13. The second control element 12 is now assigned only the information that the original call is being conducted, so that upon actuation of the second control element 12, no function is activated. The recording and conference call functions are realized in FIG. 5b) the same way as in FIG. 5a).

Figure 6:
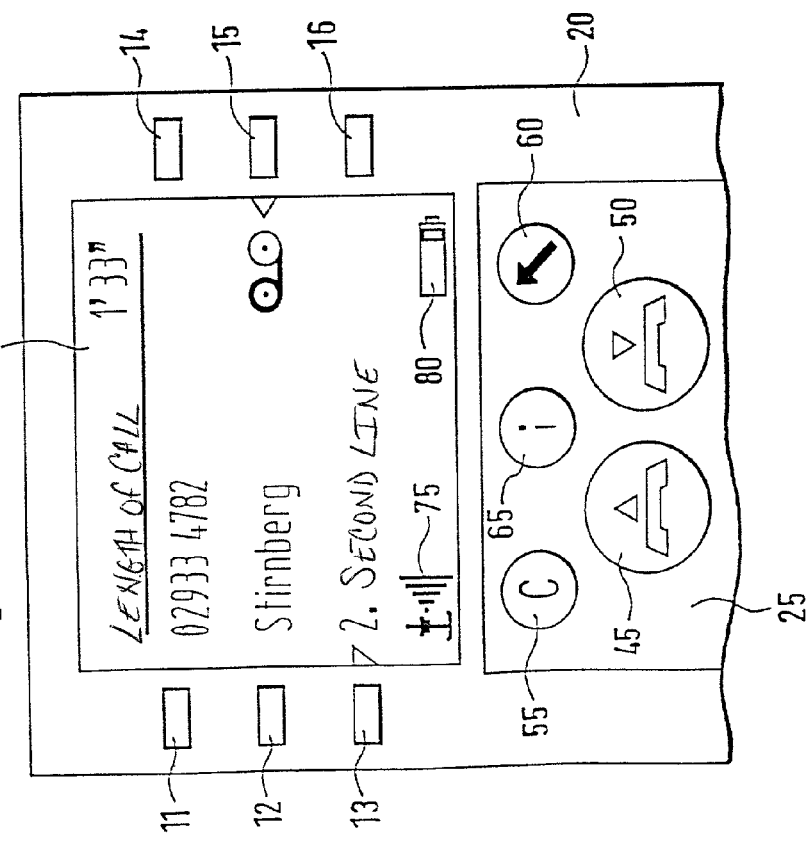

If when the basic menu in FIG. 10 is displayed the first control element 11 is actuated, then the telephone book function is selected as a menu subitem, and it is then shown on the display device 5 as the new main menu item as in FIG. 6. As the menu subitem for the telephone book function, an entry in the telephone number memory is shown on the display device 5. This entry, in the exemplary embodiment of FIG. 6, includes the first and last name of a telephone subscriber. The fourth control element 14, by means of an upward-pointing arrow on the display device 5, is assigned the function of selecting the next party in the telephone number memory in the direction of the beginning of the alphabet and having it displayed on the display device 5. The sixth control element 16, by means of a downward-pointing arrow on the display device 5, is assigned the function of selecting the next party in the telephone number memory in the direction toward the end of the alphabet and making it be displayed on the display device 5. Via the first control element 11, the telephone number of the telephone subscriber currently shown on the display device 5 is selected from the telephone number memory. This telephone number is visibly assigned to the first control element 11. Via the third control element 13, additional information on the telephone subscriber, currently shown on the display device 5, can be selected from the telephone number memory, which can include for instance the address of this party.

Figure 7:
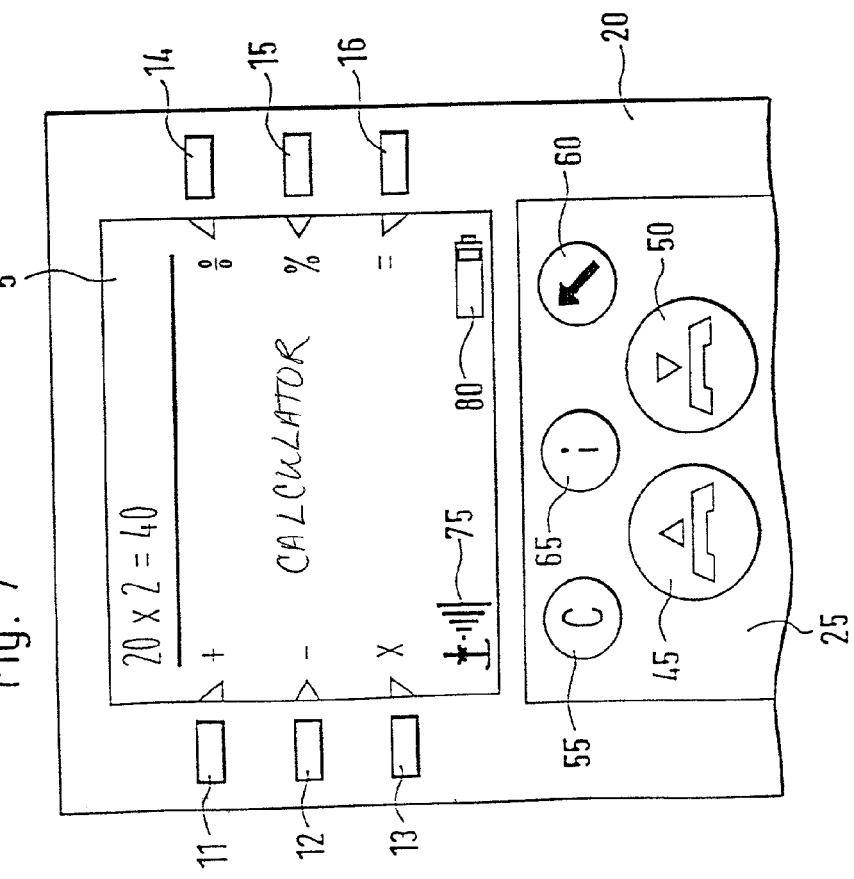

If when the basic menu is shown on the display device 5 as in FIG. 10 the second control element 12 is actuated, then the menu subitem "calculator" is selected, and a switchover to a new screen shown in FIG. 7 is made, where the calculator function is displayed as the new main menu item. Then the first control element 11 is assigned an addition function, the second control element 12 is assigned a subtraction function, the third control element 13 is assigned a multiplication function, the fourth control element 14 is assigned a division function, the fifth control element 15 is assigned a percent function, and the sixth control element 16 is assigned a result function. The input of digits is done via the alphanumeric 10-key keypad 30. A calculation process currently being performed is also displayed on the display device 5.

Figure 8:
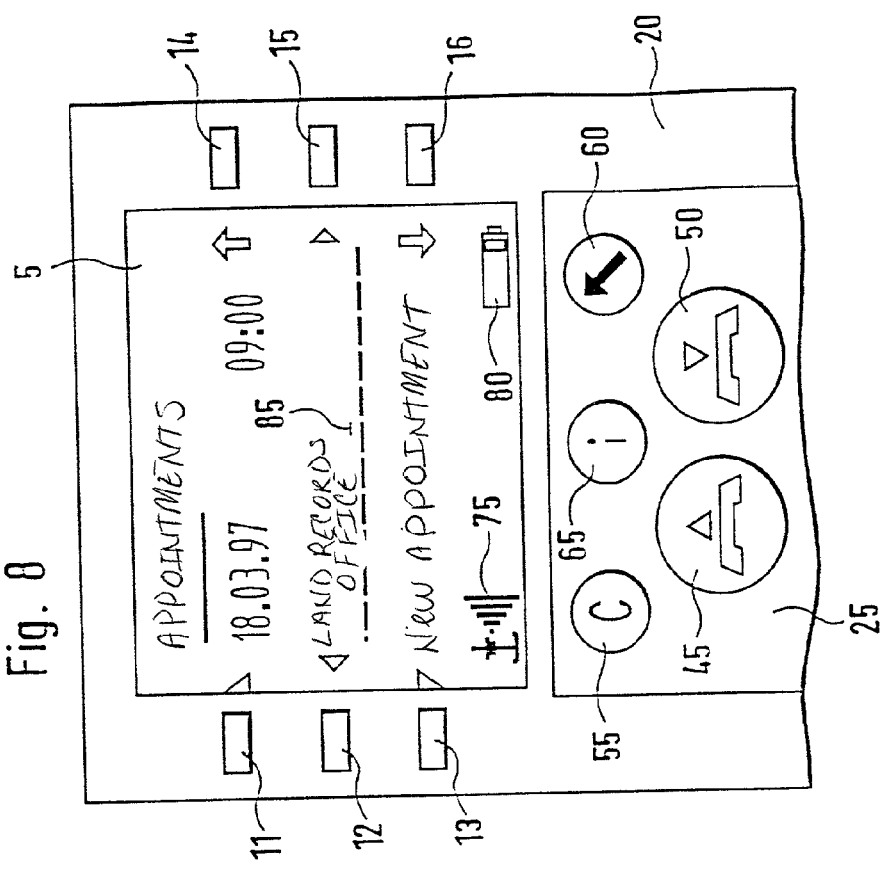

If, from the basic menu shown on the display device 5 in FIG. 10, the appointments function is selected as a menu subitem by actuation of the third control element 13, then the appointments function appears as a new main menu item of a new screen on the display device 5 in FIG. 8. Also shown on the new screen of the display device 5 is an entry from an appointments memory of the radio apparatus 1, in the form of an abbreviation or code for of the corresponding appointment. A name is assigned to the appointment. Via the fourth control element 14, with which an upward-pointing arrow in the display device 5 is associated, the next earlier appointment can be selected from the appointments memory and made to be displayed on the display device 5. Via the sixth control element 16, with which a downward-pointing arrow on the display device 5 is associated, the next later entry in the appointments memory can be selected and displayed on the display device 5. Analogously to the telephone book function, naturally some other order than alphabetic order is also conceivable, for instance with the number of letters or the like. The date and time of the appointment currently shown on the display device is assigned to the first control element 11. When the first control element is actuated, this appointment is selected as a menu subitem and shown as a new main menu item in a new screen on the display device 5, which makes it possible to change this appointment. Upon actuation of the third control element 13, the function "new appointment" is selected, and once again, by means of a new screen, it appears as a new main menu item, and the new screen on the display device 5 then makes it possible to enter a new appointment, for instance beginning at a zero position.

The entry of a name in the selected telephone book function of FIG. 6 or the selected appointment function of FIG. 8 is done by means of the alphanumeric 10-key keypad 30; A single display of this entry is made on the display device 5. The current entry is always made at a position on this displayed line that is represented by a blinking cursor 85. The position of the cursor 85 can be shifted to the left or right in this line by means of the second control element 12 and the fifth control element 15, respectively, as is graphically illustrated by the arrow directions on the display device 5 associated with these control elements 12, 15.

Figure 9:
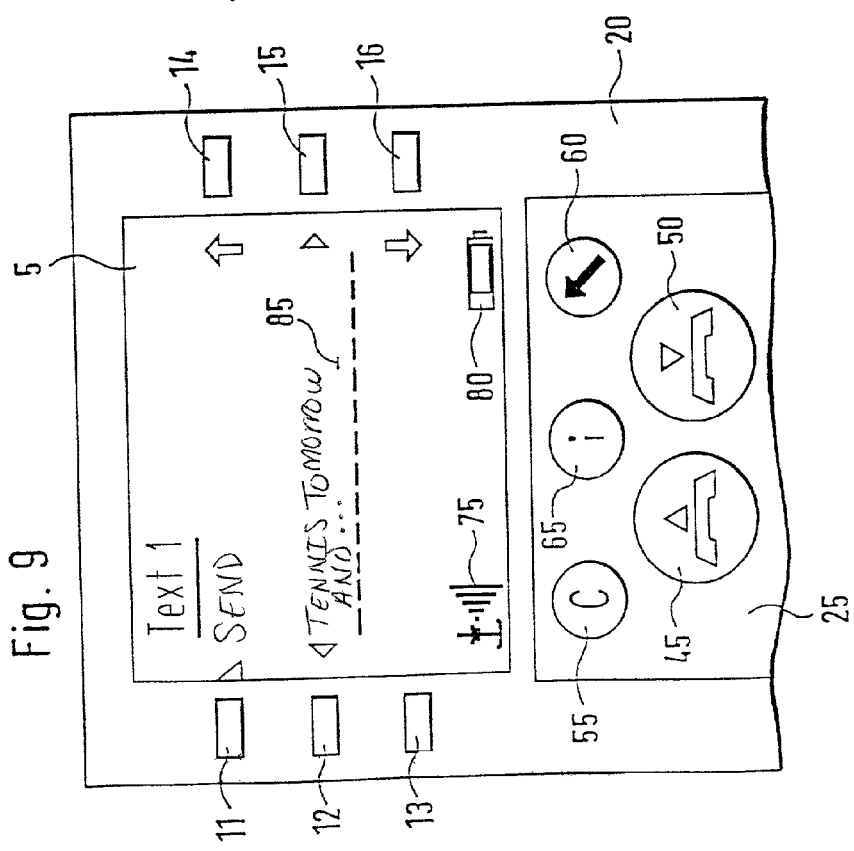

The same is also true for entering text on a text editor screen of the display device 5, after the appropriate menu subitem has been selected from the basic menu of FIG. 10 using the fifth control element 15. The text editor screen on the display device 5 is shown if FIG. 9. In the text editor function of FIG. 9, further text can be selected from a text memory of the radio apparatus 1 and made to be shown on the display device 5 by actuation of the fourth control element 14 or sixth control element 16. An upward-pointing arrow on the display device 5 is then assigned to the fourth control element 14, and a downward-pointing arrow on the display device 5 is associated with the sixth control element 16. Upon actuation of the fourth control element 14, the text memory is run through in a first direction, for instance toward the beginning of the alphabet, to select a stored text. Upon actuation of the sixth control element 16, the text memory is run through in a second direction opposite the first, toward the end of the alphabet, to select a stored text. Upon actuation of the first control element 11, a send function is called up, and then a new screen is shown on the display device 5 for entering the desired person to be called or his telephone number.

The invention is not limited to the exemplary embodiments described. Instead, arbitrary other screens are conceivable, in which control elements 11, . . . , 16 are given assignments analogously, preferably using arrow-shaped graphic symbols, for improved association with corresponding displays on the display device 5 of functions of the radio apparatus. These displays can also be stored in memory in color for the sake of better association. The control elements 11, . . . , 16 can also be made capable of lighting up. As needed, the display device 5 can also be made larger or smaller and can be flanked by more or fewer control elements.

The invention claimed is:

1. A radio apparatus embodied-in a radio-telephone, comprising a display device; a first control element and a second control element each for selecting and/or activating functions of the radio apparatus which are displayed on said display device; said first and second control elements being disposed neighboring said display device so that a local association exists between said first and second control elements and displaying of functions of the radio apparatus on said display device, wherein a first operating state is provided in which an information about said first operating state on said display device is associated with said first control element, said first control element having no function and merely the information about said first operating state is assigned and in which a function for activation of a second operating state on said display device is associated with said second control element, wherein said second operating state is associated with said first operating state, and wherein in said second operating state an information about said second operating state on said display device is associated with said second control element, said second control element having no function and merely the information about said second operating state is assigned and in which a function for activation of said first operating state on said display device is associated with said first control element.

2. A radio apparatus in accordance with claim 1, wherein said radio apparatus comprises a third and fourth control elements for selecting and/or activating functions of said radio apparatus and wherein in said first and second operating states said third and fourth control elements are associated with respective functions of the radio apparatus which remain unchanged upon a change between said first and second operating states.

* * * * *

UNITED STATES PATENT AND TRADEMARK OFFICE
CERTIFICATE OF CORRECTION

| | | |
|---|---|---|
| PATENT NO. | : 8,036,712 B1 | Page 1 of 1 |
| APPLICATION NO. | : 09/367569 | |
| DATED | : October 11, 2011 | |
| INVENTOR(S) | : Wolfgang Weidner et al. | |

It is certified that error appears in the above-identified patent and that said Letters Patent is hereby corrected as shown below:

On the Title page, column 2, foreign patent documents, of the printed patent, please change "CH 686 541 4/1996" to --CH 197 06 595.3 2/1997--.

Signed and Sealed this
Third Day of January, 2012

David J. Kappos
*Director of the United States Patent and Trademark Office*